(12) United States Patent
Dunn Berger et al.

(10) Patent No.: US 8,352,687 B2
(45) Date of Patent: Jan. 8, 2013

(54) PERFORMANCE OPTIMIZATION AND DYNAMIC RESOURCE RESERVATION FOR GUARANTEED COHERENCY UPDATES IN A MULTI-LEVEL CACHE HIERARCHY

(75) Inventors: Deanna Postles Dunn Berger, Poughkeepsie, NY (US); Michael F. Fee, Cold Spring, NY (US); Arthur J. O'Neill, Jr., Poughkeepsie, NY (US); Robert J. Sonnelitter, III, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 12/821,726

(22) Filed: Jun. 23, 2010

(65) Prior Publication Data

US 2011/0320728 A1    Dec. 29, 2011

(51) Int. Cl.
    *G06F 12/08* (2006.01)
(52) U.S. Cl. ........................ 711/140; 711/141
(58) Field of Classification Search .......... None
    See application file for complete search history.

(56) References Cited

U.S. PATENT DOCUMENTS

| | | | |
|---|---|---|---|
| 4,755,930 A * | 7/1988 | Wilson et al. | 711/122 |
| 6,175,899 B1 * | 1/2001 | Baylor et al. | 711/144 |
| 6,938,128 B1 * | 8/2005 | Kuskin et al. | 711/141 |
| 6,973,548 B1 * | 12/2005 | Vartti et al. | 711/141 |
| 7,065,614 B1 * | 6/2006 | Vartti et al. | 711/141 |
| 7,689,771 B2 | 3/2010 | Fields, Jr. et al. | |
| 7,698,508 B2 | 4/2010 | Rajamony et al. | |
| 2008/0104333 A1 * | 5/2008 | Veazey | 711/141 |
| 2010/0042771 A1 * | 2/2010 | Kawaguchi | 711/5 |

* cited by examiner

*Primary Examiner* — Kaushikkumar Patel
(74) *Attorney, Agent, or Firm* — Cantor Colburn LLP; John Campbell

(57) ABSTRACT

A cache includes a cache pipeline, a request receiver configured to receive off chip coherency requests from an off chip cache and a plurality of state machines coupled to the request receiver. The cache also includes an arbiter coupled between the plurality of state machines and the cache pipe line and is configured to give priority to off chip coherency requests as well as a counter configured to count the number of coherency requests sent from the cache pipeline to a lower level cache. The cache pipeline is halted from sending coherency requests when the counter exceeds a predetermined limit.

7 Claims, 4 Drawing Sheets

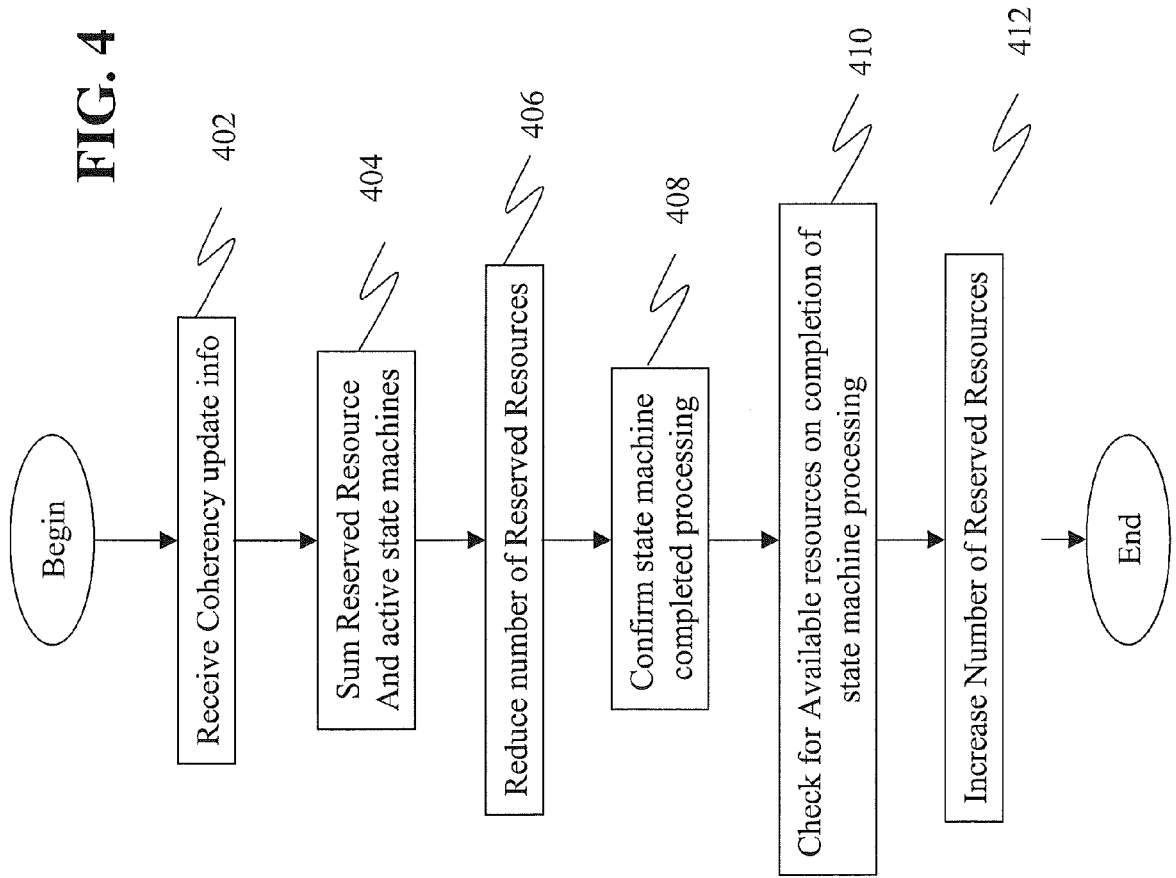

PERFORMANCE OPTIMIZATION AND DYNAMIC RESOURCE RESERVATION FOR GUARANTEED COHERENCY UPDATES IN A MULTI-LEVEL CACHE HIERARCHY

BACKGROUND

This invention relates generally to processing within a computing environment, and more particularly to computing systems having a multilevel cache hierarchy.

In computers, a cache is a component that improves performance by transparently storing data such that future requests for that data can be served faster. The data that is stored within a cache might be values that have been computed earlier or duplicates of original values that are stored elsewhere (e.g. main memory). If requested data is contained in the cache (cache hit), this request can be served by simply reading the cache, which is comparably faster. Otherwise (cache miss), the data has to be recomputed or fetched from its original storage location, which is comparably slower.

Cache operations in a shared cache may be performed by accessing a shared pipeline. A pipeline may be considered as a set of data processing elements connected in series, so that the output of one element is the input of the next one. An instruction pipeline may be used in a computing device to increase instruction throughput (the number of instructions that can be executed in a unit of time). The fundamental idea is to split the processing of a computer instruction into a series of independent steps, with storage at the end of each step. This allows the computer's control circuitry to issue instructions at the processing rate of the slowest step, which is much faster than the time needed to perform all steps at once. The term pipeline refers to the fact that each step is carrying data at once (like water), and each step is connected to the next (like the links of a pipe.)

In prior art systems that included multi-level caches, the highest level of the cache hierarchy served as both the point of coherency for the system and the source of data to be provided to lower level caches.

BRIEF SUMMARY

An embodiment of the present invention is directed to is a cache that includes a cache pipeline, a request receiver configured to receive off chip coherency requests from an off chip cache and a plurality of state machines coupled to the request receiver. The cache of this embodiment also includes an arbiter coupled between the plurality of state machines and the cache pipe line that is configured to give priority to off chip coherency requests and a counter configured to count the number of coherency requests sent from the cache pipeline to a lower level cache. In this embodiment, the cache pipeline is halted from sending coherency requests when the counter exceeds a predetermined limit.

According to another embodiment, a memory system is disclosed. The memory system of this embodiment includes an off chip cache configured to source a cache line to a requester without checking the update status of the cache line and to create an off chip coherency request. The memory system of this embodiment also includes a shared cache coupled to the off chip cache and configured to receive the off chip coherency request and to ensure that an instruction to invalidate the cache line is received by a lower level cache before the cache line is sourced.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES:

FIG. 4 is a flow chart showing a method of dynamically balancing resource reservations.

DETAILED DESCRIPTION

Figure 1:
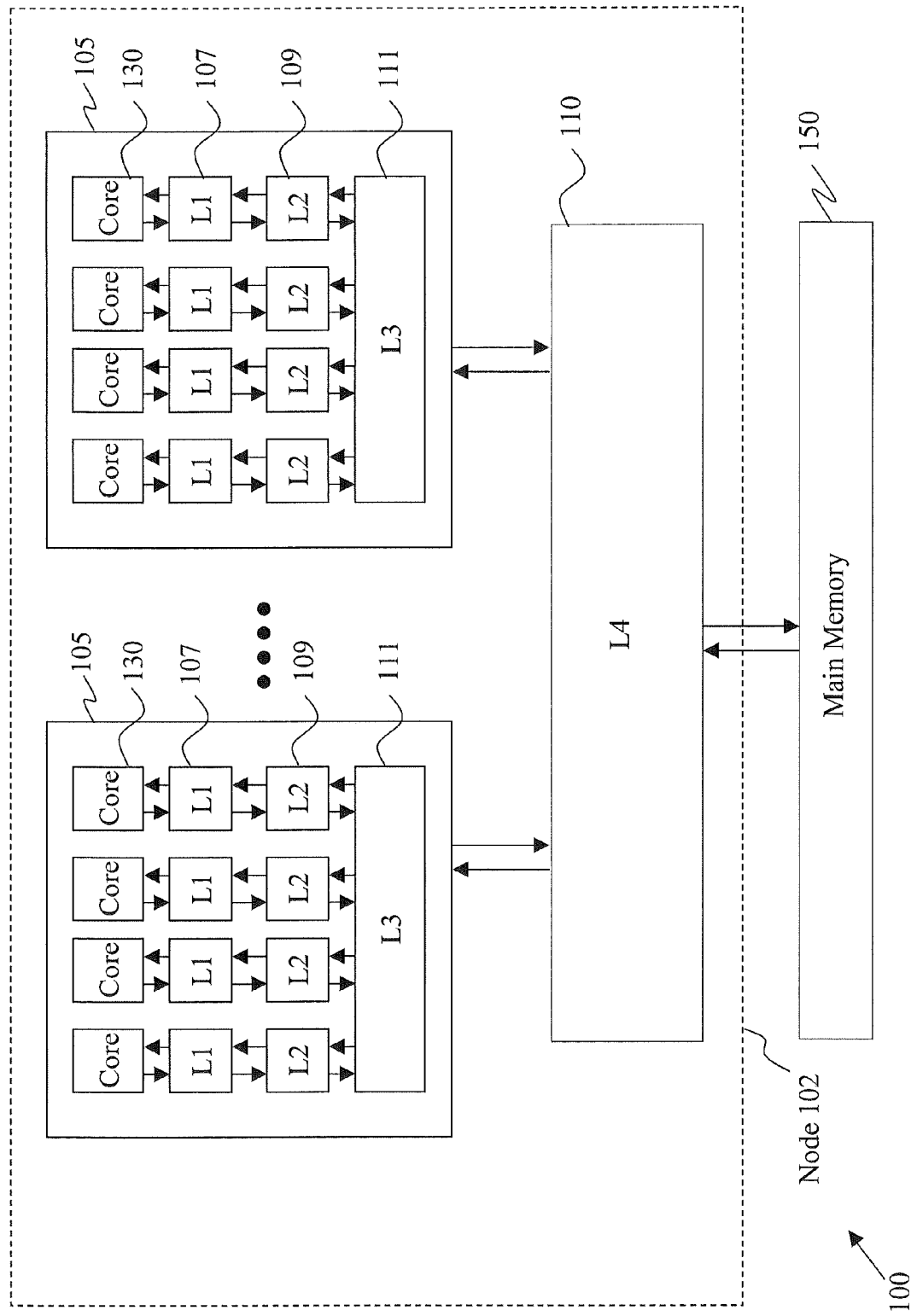
FIG. 1 depicts an example of system on which embodiments of the present invention may be implemented.

FIG. 1 illustrates an example of a computing system 100 according to one embodiment. The system includes one or more nodes 102. In one embodiment, the system 100 may include four nodes 102. In a computing system, multiple nodes 102 may be operatively connected to one another for communicating such as making and responding to requests, as understood by one skilled in the art.

Each node 102 includes one or more central processors 105. In one embodiment, each node 102 includes six central processors 105. The central processors 105 include one or more cores 130 that perform the reading and executing of instructions. In one embodiment, one or more of the central processors 105 include four cores 130. Of course, the central processors 105 could include any number of cores 130 that is greater than or equal to two.

In one embodiment, one or more of the central processors 105 include four cores 130. Of course, the central processors 105 could include any number of cores 130 that is greater than or equal to two.

Each core 130 is operatively coupled to its own L1 and L2 cache, 107 and 109 respectively. The L1 caches 107 are physically closest to the cores 130 and the L2 caches 109 are coupled to the L1 caches 107. Each L2 cache 109 in each central processor 105 is coupled to a single L3 cache 111. In this manner, the L3 cache 111 is shared by multiple L2 caches 107.

The node 102 also includes one or more L4 caches 110. The L4 caches 110 are operatively coupled to two or central processors 105. In this manner, the L4 caches 110 are shared by multiple L3 caches 111. The system 100 may also include main memory 150 operatively coupled to the L4 caches 110.

In one embodiment, the L3 caches 111 and L4 cache 110 are formed of embedded dynamic random access memory (DRAM) which is referred to as eDRAM. Of course, it is understood by a skilled artisan that any other types of suitable memory such as DRAM may be utilized. In one embodiment, the L2 caches 109 may be formed of static random access memory (SRAM).

In one embodiment, each individual central processor 105 is fabricated on its own separate chip, which includes the L1, L2, and L3 caches, and the L4 cache 110 is fabricated on its own separate chip. As understood by a skilled artisan, fabrication of chips including integrated circuits, wires, metal layers, semiconductor (and/or other material) components, etc., may be formed via lithography and other techniques. The fabrication process may include various deposition techniques including physical vapor deposition (PVD), chemical vapor deposition (CVD), electrochemical deposition (ECD), molecular beam epitaxy (MBE), and atomic layer deposition (ALD) among others.

In an exemplary embodiment, the L1 caches 107 are between 96 and 128 KB, the L2 caches 109 are 1.5 MB, the L3 cache 111 is 24 MB and the L4 cache 110 is 192 MB. Of course other sizes could be utilized. In FIG. 1, the four different levels of caches (L1, L2, L3 and L4) are shown. Of course, such an organization of caches is exemplary only and the teachings herein may be applied to any situation where multiple requesters have access to a shared cache and the shared cache is one of a plurality of shared caches that have access to another shared cache.

The L3 cache 111 is a departure from prior schemes in that it introduces a shared cache between the L2 109 and L4 110 caches. That is, in the prior art, the L2 caches 109 were coupled directly to the L4 cache 110. Accordingly, in the prior art, the L4 cache 110 was both the point of coherency for the node 102 and the source of its data.

In one embodiment, the L2 cache 109 is a write-through cache. Thus, any change in the L2 cache 109 is immediately updated in the L3 cache 111. The L3 cache 111, on the other hand, is a write back cache. Thus, changes in the L3 cache 111 are not updated to the L4 cache until requested by the L4 cache 110 (e.g., the L4 cache 110 requests that the L3 cache 111 invalidate a line) or the L3 cache 111 is changed such that the line is invalidated (e.g., the L3 cache 111 swaps out the line).

Given that the L3 cache 111 is a write back cache and may source data to L2 caches 109, there are instances where the L4 cache 110 may not include the most up to date data contained in the L3 cache 111. In such instances, to maintain coherency, in the event that the L4 cache 110 receives an access request for data on a particular cache line (or a portion thereof) from main memory 150 it must first query the L3 cache 111 to determine if it has an updated copy of the data and send coherency updates to the lower level caches if the L4 cache 110 requires the L3 cache 111 to change its state with respect to cache line. These requirements may add latency to all requests to the L4 cache 110, which now must go through the extra step of communicating with the L3 cache 111 before responding to a request.

Figure 2:
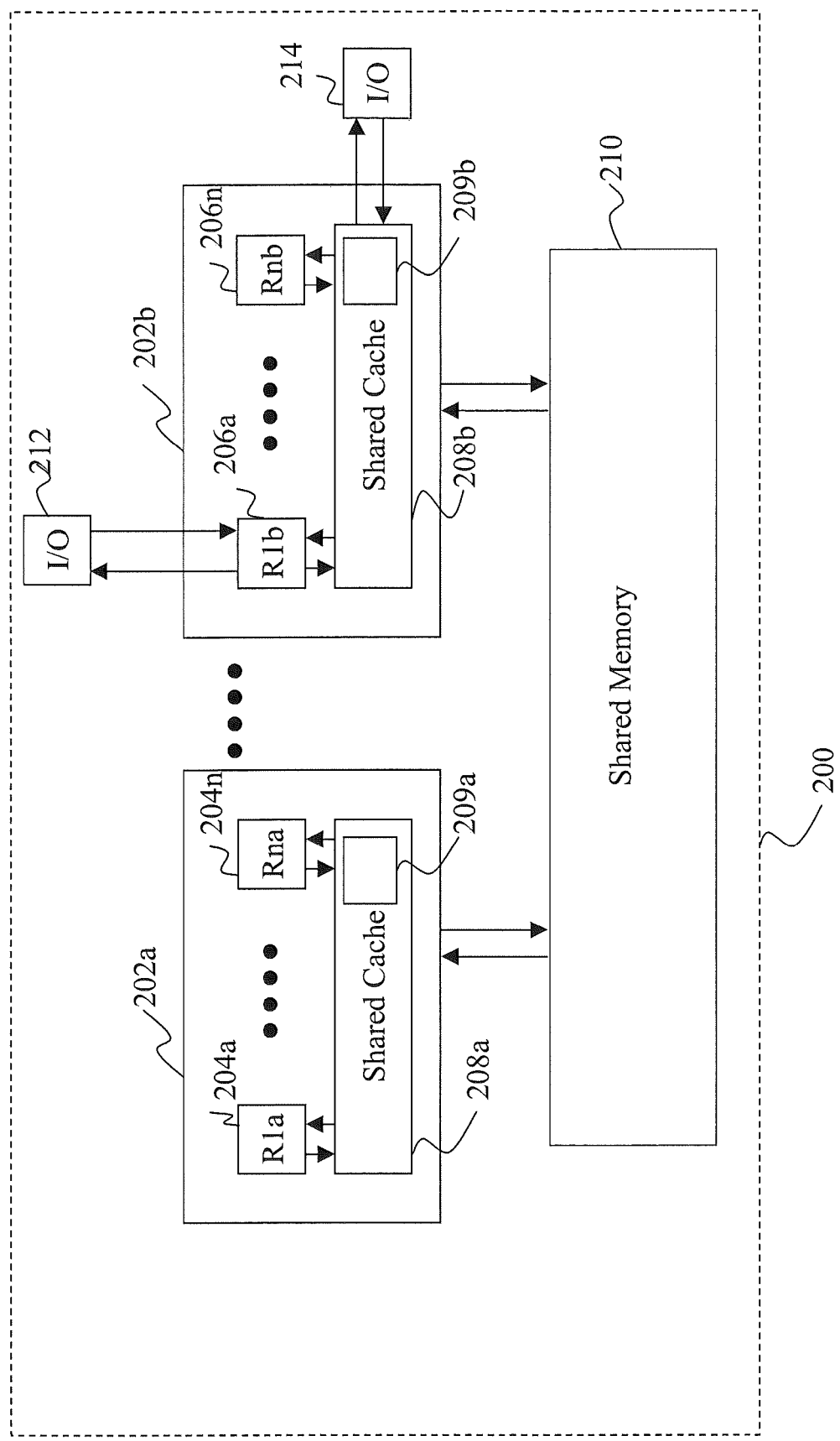
FIG. 2 depicts an alternative embodiment of a system on which embodiments of the present invention may be implemented.

FIG. 2 illustrates an alternative embodiment of a node 200. In this embodiment, the node 200 includes one or more central processors 202a . . . 202b. Each central processor 202 includes a shared cache 208 that includes a shared cache controller 209. The node also includes a shared memory 210 that may be accessed by each of the shared caches 208.

In general, the shared caches 208 receive requests for information (including both data and instruction requests) and if the requested data is contained in the shared caches 208 (cache hit), this request can be served by simply reading the shared cache 208. Otherwise, a cache miss occurs and the data is requested from shared memory 210. The determination of whether a cache hit or miss exists and the general operation of the shared cache 208 is controller by the shared cache controller 209. Of course, any of the caches described herein may include a cache controller.

In one embodiment, the shared cache controller 209 is implemented to include a pipeline and other elements. The shared cache controller 209 may also be responsible for coherency checking. In one embodiment, the shared caches 208 are write back caches.

In more detail, each shared cache 208 is coupled to two or more requesters. For example, shared cache 208a is coupled to requesters 204a . . . 204n and to shared memory 210, all of which may issue requests to the shared cache 208a. For example, shared memory 210 or requestors 204a . . . 204n may request a copy of a particular cache line contained in shared cache 208a. In one embodiment, the requestors 204a . . . 204n are caches. However, the requestors may include other types of device. For example, requestor 206a . . . 206n are coupled to shared cache 208b in central processor 202b. In one embodiment, requestor 206a is an I/O device controller and is coupled to an I/O device 212. The I/O device 212 may be located on a separate chip than central processor 202b. Of course, some I/O devices may include internal drivers and may be directly coupled to the shared cache 208b. One or ordinary skill will realize that other embodiments where a shared cache 208 is coupled to a shared memory 210 and to two or more other requestors, regardless of whether the other requestors are on the same chip as the shared cache, are within the scope of the present invention.

As described above, the on-chip shared cache 208 is a departure from prior schemes in that it introduces a shared cache between the requestors (204, 206) and the shared memory 210. It shall be understood that shared memory 210 may be coupled to main memory 150 (FIG. 1). In one embodiment, the shared cache 208 is a write back cache. Thus, in some embodiments, the shared cache 208 may serve as the source of data and that data may be different than data stored in main shared memory 210. As described above, in the event that the shared memory 210 receives an access request for data on a particular cache line (or a portion thereof) from main memory 150 (FIG. 1) it must first query the shared cache 208 to determine if it has an updated copy of the data and also to send it coherency updates if the shared memory 210 requires the shared cache 208 to change its state with respect to a cache line. These requirements may add latency to all requests to the shared memory 210 which now must go through the extra step of communicating with the shared cache 208 before responding to a request.

In some cases, the shared memory 210 knows that the shared cache 208 does not have a more up to date copy of the data, so the data can be sourced directly from the shared memory 210. These cases include where the shared memory 210 wants to convert a shared read only line to an exclusive line. However, the shared memory 210 needs to ensure that the shared cache 208 and any requestor coupled thereto (e.g., any lower level cache) are notified to invalidate its copy of the cache line before it can source the data to the requester. This requirement means that the shared memory 210 cannot return data until it knows that the shared cache 208 has sent a command (e.g. coherency checks) to any lower level cache to ensure that lower level cache invalidates its copy of the data. If the shared cache 208 can guarantee the processing of the coherency updates from the shared memory 210 in these cases, then it is not necessary for the shared memory 210 to wait for the shared cache 208 to indicate that is has removed its data before returning data to the requestor which reduces the time to process a request. Embodiments of the present invention are directed to ensuring that such assurances can be made.

In more detail, requests to the shared memory 210 may request exclusive access to a line or read-only access to the line. Embodiments of the present invention are directed to cases where the request to a shared memory 210 include a request for the data and that the cache line be made converted from a shared read only line to an exclusive line. Since the line is shared read-only, all copies in the shared cache 208 and shared memory 210 caches are the same. The shared memory 210 is therefore able to directly supply the data for this request. However, the shared caches 208 that have a copy of the cache line must lock that line to other requesters (e.g., requestors 204) and notify any requestor 204 to invalidate the line before the shared memory 210 sends the data to the original request.

In more concrete terms, assume that the first shared cache 208a has made a request to make a currently shared read only cache line exclusive. As such, the first shared cache 208 may also be referred to herein as the requesting shared cache 208a. Also assume that the second shared cache 208b has a copy of the cache line as does requester 206a. The shared memory 210 sends a request to the second shared cache 208b information to invalidate the cache line. In turn, this causes the second shared cache 208b to send a command (coherency check) to requester 206a informing it to invalidate the line. However, this command must be executed without any delay because, as discussed above, the shared memory 210 is free to source data to the requesting shared cache. To ensure that the request is sent from the shared cache 208b and received by the requester 206 before the shared memory begins sourcing data to the first requestor 208a, the second shared cache 208b may be configured to operate in a particular manner. For instance, the second shared cache 208b may ensure that the coherency updates will be sent to the lower level caches (e.g., requesters 206) with a fixed delay from when they are received from shared memory 210. It shall be assumed that once received by the requestors 206, the command will be executed.

Figure 3:
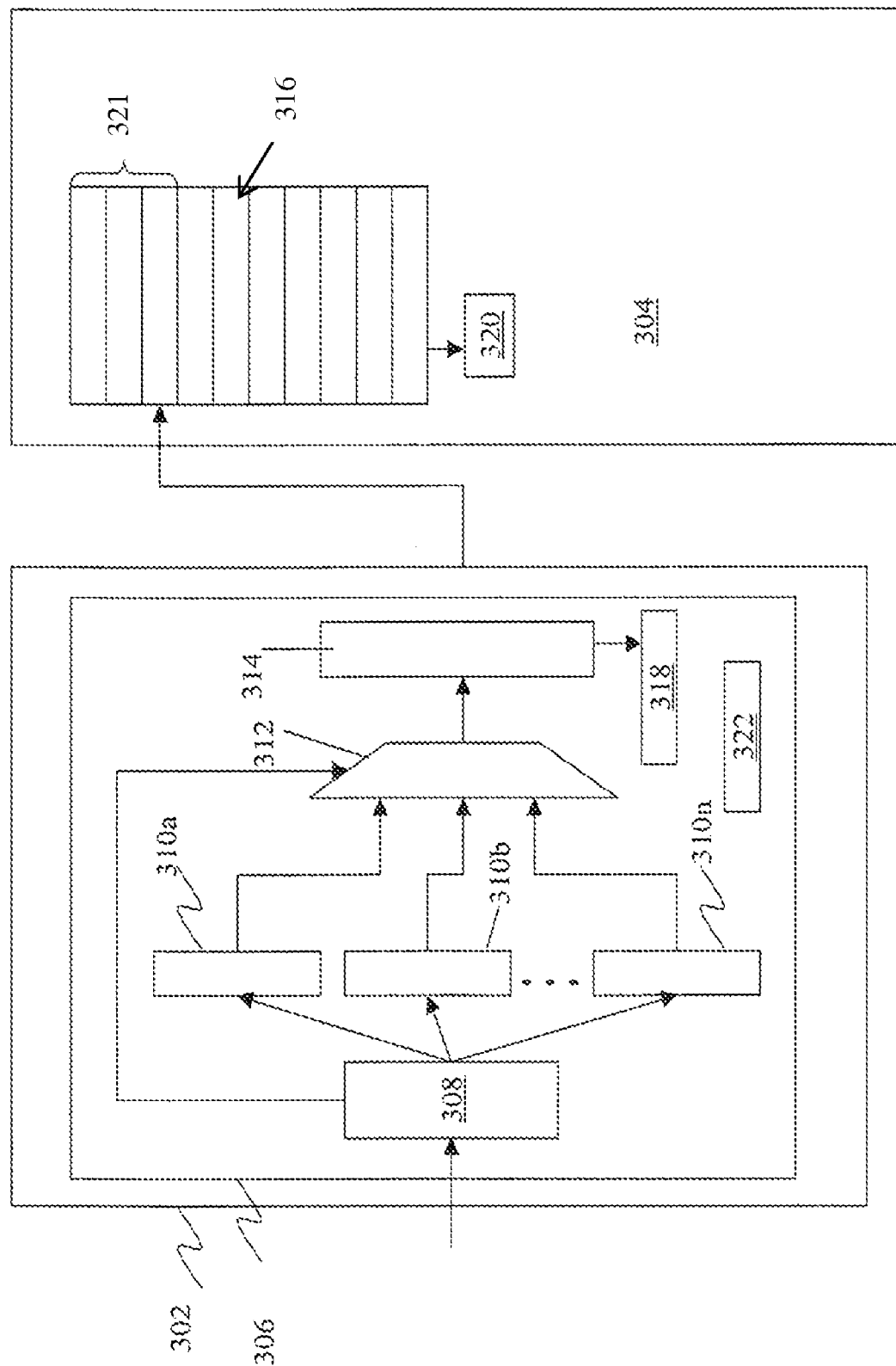
FIG. 3 depicts shared cache coupled to a lower level cache according to one embodiment.

FIG. 3 shows an example of shared cache 302 coupled to a lower level cache 304. In this example, the shared cache 302 may be coupled to several additional lower level caches (not shown). The shared cache 302 may receive off chip coherency requests from an external memory such as the L4 cache 110. The shared cache 302 includes a cache controller 306. In one embodiment, the shared cache 302 has a fixed limit to the number of off chip coherency requests from the L4 cache 110 it can process at any given time. This limit shall be referred to as a off chip coherency limit herein. In one embodiment, the shared cache 302 may be able to handle 12 off chip coherency checks from the L4 cache 110. In such an embodiment, the off chip coherency limit would be 12. It shall be understood that the L4 cache 110 may be replaced with other types of requestors.

The cache controller 306 may include a request handler 306. In normal operation, the request handler 308 receives many different types of requests. For example, the request handler 308 may receive off chip coherency requests, fetch requests and store requests, among others. The request handler 308 assigns the requests to state machines 310 based on the type of request it is. In one embodiment, all off chip coherency requests are assigned to a particular state machine or set of state machines. The size of the set of these dedicated state machines may be equal to the off chip coherency limit. For example, in FIG. 3 state machines 310a-310l may be reserved for off chip coherency checks and the remainder for other operations. All of the state machines 310 may be coupled to and provide cache pipeline requests to an arbiter 312. This arbiter 312 selects requests to provide to the shared cache pipeline 314. In another embodiment, specific state machines may not be reserved. Rather, from the set of state machines 310 a number of them are reserved to ensure that all of the requests up to the off chip coherency limit may be immediately accepted.

In the event that an off chip coherency request from the L4 cache 110 is received by the request handler 308, as discussed above, embodiments disclosed herein ensure that that coherency updates will be sent, and received, by the lower level cache 304 within a delay equal to or less than a fixed time delay limit. To this end, in the event that the request handler 308 receives an off chip coherency request from the L4 cache 110, the request handler 308 assigns the request to one of the reserved or otherwise available state machines 310. In addition, request handler 308 notifies the arbiter 312 that such a request has been received and where it has been assigned. In the case where the arbiter 312 is implemented in hardware, the notification may force the arbiter 312 to select the state machine 310 to which the request was assigned. The arbiter 312 then causes the off chip coherency request to be passed into the shared cache pipeline 314. The shared cache pipeline 314 then sends, without delay, the coherency requests to the lower level cache 304. In this manner, the shared cache 302 can ensure that coherency updates are sent within the fixed delay.

In addition, as described above, the shared cache 302 may also be required to ensure that the coherency request is received before the L4 cache 110 begins sourcing data. In one embodiment the lower level cache 304 may include a coherency queue 316. The coherency queue 316 is a stack that stores coherency requests received from the shared cache 302. The cache controller keeps track of the number of coherency requests it has sent to the lower level cache 306 in a counter 318. The counter 318 is incremented whenever a coherency request is sent and decremented when the request is removed from the coherency queue 316 (i.e., it is processed by a lower level cache state 320). As discussed above, the coherency queue 316 may include x slots. To ensure that the coherency queue 316 has room to accept all coherency requests that are the result of off chip coherency requests, the shared cache 302 reserves a number of slots, reserved slots 321, in the coherency queue 316. This may be accomplished by halting coherency requests from other than off chip coherency requests when the counter 318 is equal to the number of slots in the coherency queue 316 less the off chip coherency limit (e.g., x-off chip coherency limit).

In addition, upon receipt of the off chip coherency request, the shared cache 302 may invalidate the cache line of interest in its cache directory 322 to ensure that no other requestors may access the line. In one embodiment, any requests active in the shared cache 302 that involve the cache line at the time the coherency check is received from the L4 cache 110 are terminated.

As discussed above, in a multi level cache hierarchy, it may be advantageous for lower level caches to guarantee the availability of resources for processing coherency requests from a higher level cache in a timely manner in order to avoid coherency problems and optimize system performance. A simple way of doing this is to allocate a fixed number of resources to the processing of these coherency requests from the higher level cache. This ensures that resources are always available to process the coherency update. However, the resource being reserved may be a scarce resource and a large number of them need to be reserved to guarantee availability for off chip coherency updates. This lessens their availability for coherency requests originating from on chip requests. As the requests sourced from off chip (e.g., from L4 cache 110) are guaranteed to go, they are therefore higher priority than the on chip requests, which means that the on chip requests may be delayed more than necessary by the off chip requests. This negatively impacts the performance of the local on chip requests.

Accordingly, one embodiment of the present invention is directed to a method to dynamically balance the resource reservation in a manner that guarantees their availability for off chip coherency requests while not penalizing requests from local operations. In this embodiment, the resources being reserved are coherency queues 316 on each lower level cache 304 coupled to the shared cache 302.

FIG. 4 is a flow chart showing a method of dynamically balancing resource reservations. At a block 402 off chip coherency request data is gathered. The data includes: the number of available resources on each lower level cache, the maximum number of remote coherency updates that may be simultaneously processed by the shared cache, the number of reserved resources currently in use on each lower level cache, and the number of state machines in the shared cache currently processing remote coherency updates.

At a block 404, the number of reserved resources used and the number of shared cache state machines in use processing a request are combined to form an adjustment value. If the state machine to process an off chip coherency requests is busy, then there is no need to reserve resources for them any longer.

At a block 406, the number of reserved slots in the coherency queue for each lower level cache is reduced by the adjustment value. In terms of FIG. 3, the limit on counter 318 may be raised by the number of adjustment value. This frees up additional resources to be used by local (e.g., on the shared cache) requestors. As the state machines finish their operation, they first check to ensure that a sufficient number of resources are available for future off chip coherency updates at a block 408 before it responds, at a block 410, that its request is complete. That may include determining that each coherency queue includes at least one open slot. If not, the state machine will delay its response until such a condition exists. After the response is made, the number of reserved resources is increased at a block 412. This may be accomplished, for example, by decreasing the limit on counter 318.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A cache comprising:
   a cache pipeline;
   a request receiver configured to receive off chip coherency requests from an off chip cache;
   a plurality of state machines coupled to the request receiver;
   an arbiter coupled between the plurality of state machines and the cache pipe line, the arbiter configured to give priority to off chip coherency requests; and
   a counter configured to count a total number of coherency requests, including off chip coherency requests, sent from the cache pipeline to a lower level cache;
   wherein the cache pipeline is halted from sending coherency requests when the counter exceeds a predetermined limit.

2. The cache of claim 1, wherein the arbiter is coupled to the request receiver and is configured to receive a signal from the request receiver that causes it to give priority to a one of the plurality of state machines to which an off chip coherency request is assigned.

3. The cache of claim 1, wherein the predetermined limit is based on a size of a coherency queue located in the lower level cache.

4. The cache of claim 1, wherein the predetermined limit is based on a size of the coherency queue and an off chip coherency request limit for the cache.

5. The cache of claim 1, further comprising:
   a cache directory; and
   wherein the off chip coherency request includes identification of a cache line;
   wherein the cache line is locked in the cache directory when the off chip coherency request is received.

6. The cache of claim 1, in combination with the lower level cache.

7. The cache of claim 6, wherein the cache and the lower level cache are on a same chip.

* * * * *